June 30, 1964  E. T. BRYAND  3,139,375
SUCTION ROLL ASSEMBLY
Original Filed Sept. 15, 1960

INVENTOR
Edward T. Bryand
BY Pearson & Pearson
ATTORNEYS

United States Patent Office 3,139,375
Patented June 30, 1964

3,139,375
SUCTION ROLL ASSEMBLY
Edward T. Bryand, South Portland, Maine, assignor to Metal-Tech, Inc., South Windham, Maine, a corporation of Maine
Original application Sept. 15, 1960, Ser. No. 56,192. Divided and this application June 4, 1962, Ser. No. 213,073
9 Claims. (Cl. 162—371)

This invention relates to an improved honeycomb type open work especially adapted for forming the meshes of a meshed screen or roll such as are much used in the paper making industry.

Suction boxes, suction rolls, dandy rolls, embossing rolls and the like have been formed in many different ways in the past, and usually consist of a frame or skeletonized spider-type support with an apertured plate or a wire mesh screen supported thereby. Edgewise upstanding corrugated elements have been disclosed in U.S. Patent 2,240,869 to Specht of May 6, 1941, and U.S. Patent 2,803,172 to Trotman of August 20, 1957, for serving as the inner hollow cylindrical sieve which supports the outer wire mesh screen covering of a cylindrical, meshed roll. Edgewise upstanding elements, having a band of half hexagonal corrugations have been disclosed in German Patent 396,980 to Linder of June 12, 1924, for serving as the inner sieve for supporting an outer sieve in a cylindrical roll.

It is the object of this invention to provide a honeycomb type openwork of increased strength, and uniformity of mesh size, capable of use as the foraminous covering of a suction roll without an inner supporting cylindrical sieve or cylindrical framework, and with an arcuate, honeycomb edge seal within the roll thereby forming an improved suction roll assembly.

This application is a division of my application, Serial No. 56,192, filed September 15, 1960, entitled "Honeycomb Open-Work."

Other objects and advantages of the invention will be apparent from the claims, the description of the drawings and from the drawings in which:

Figure 1:
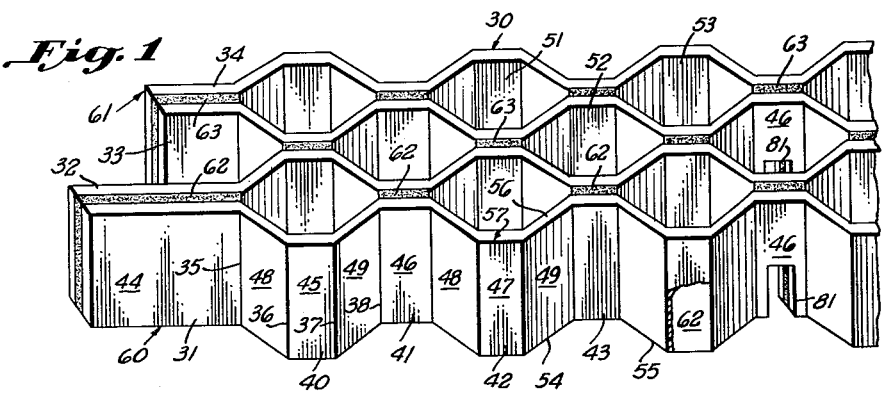
FIG. 1 is an isometric front view of a portion of a honeycomb openwork constructed in accordance with the invention.
Figure 2:
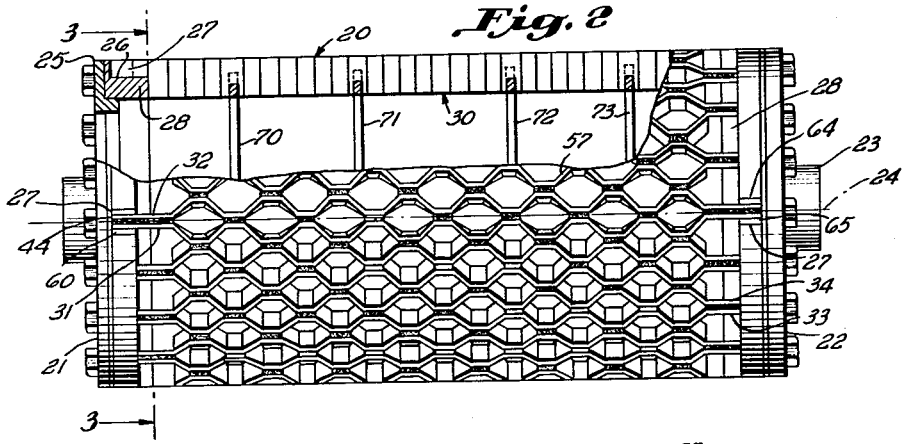
FIG. 2 is a front elevation, partly in section, of a cylindrical roll constructed in accordance with the invention.

In the drawing 20 represents a cylindrical roll constructed in accordance with the invention and suitable for use as a suction roll, cylinder mould, dandy roll, embossing roll, dryer roll or the like. The roll 20 may be of any desired length normally used in paper making machines, for example, ten to twenty feet long and may be of any desired diameter depending on the diameter of the roll heads.

Roll 20 includes a pair of oppositely disposed, circular, roll end heads 21 and 22 each being suitably journalled as at 23 in a manner well known, or otherwise mounted for the rotation of the roll around its longitudinal axis 24. Each circular head, such as 21 or 22, preferably includes an annular outer flange 25 and an inner slotted ring 26, the ring 26 having spaced longitudinally extending, radial slots 27 in the periphery thereof and a cylindrical seat, or shoulder, 28.

The honeycomb type openwork 30 of the invention, as shown in FIG. 1, is formed by a plurality of elongated, thin, wide strips of flexible material such as 31, 32, 33 and 34. Preferably, for a roll forty inches in outside diameter and ten feet in length, the strips are about .020 inch in thickness, about one and one quarter inches in width and about ten feet in straight line length after having been bent to their final shape. For longer rolls, or rolls of greater diameter, the width and thickness may be proportionately greater if desired and for smaller rolls the dimensions may be reduced.

Each strip such as 31 is bent transversely, for the full width thereof, as at 35, 36, 37 and 38, to form alternate, flat faced, ridges 40 and 42 and hollows 41 and 43 of identical half hexagonal configuration, the ridges and hollows being on one side only of the original plane of the strip. A plurality of longitudinally extending flat walls, or faces, 44, 45, and 46 and 47 are thus formed in each strip, the walls 44 and 46 being in the same longitudinal plane and the walls 45 and 47 being in a longitudinal plane laterally spaced therefrom. A pair of flat walls 48 and 49 connect the longitudinally extending walls to each other and are in planes oblique to a longitudinal plane.

Each alternate strip such as 32 and 34 is inverted and arranged in back to back position relative to one of the strips 31 or 33, and since the ridges 40 and hollows 41 are identical in each strip, full hexagonal upstanding conduits such as 51, 52 and 53 are formed over the entire openwork. The strips 31, 32, 33 and 34 are upstanding on one edge 54 thereof, whereby the hexagonal conduits 51, 52 and 53 are also upstanding, the edges 54 of the openwork defining the lower, or inner, face 55 and the opposite edges 56 defining the upper, or outer, face 57 of the openwork.

To secure the requisite longitudinal resistance to sag and for mutual support, the strips 31 and 32 of each pair of strips 60, and each pair of strips 60 and 61 are secured to each other for the full length of the openwork. As shown all of the flat, longitudinally extending walls 44, 45, 46 and 47 of all of the strips, are adhesively united over their entire meeting faces by bonding means which is preferably a layer 62 or 63 of epoxy resin. Thus the doubled walls 44 and 46 of the strips 31 and 32 are laminated to form an interrupted, longitudinally extending reinforcement for the full length of the openwork, each doubled wall being supported by a pair of oblique walls such as 48 at each end thereof. In addition, of course, when the openwork 30 is of arcuate or cylindrical configuration as in the roll 20, the arching of the openwork provides great resistance to compression or sag.

Figure 4:
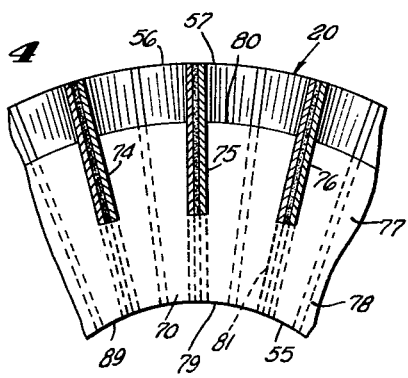
FIG. 4 is an end view, on a scale similar to that of FIG. 2, of the honeycomb openwork in arcuate, party cylindrical configuration.

When the openwork 30 is flat, as in a flat screen, the hexagonal conduits are of uniform cross section. However, when the openwork 30 is curved, as in roll 20, the bends 35, 36, 37 and 38 are slightly out of parallelism and radial to the longitudinal axis 24 of the roll. Thus the area of the hexagonal conduits 51, 52 and 53 at the outer face 57 is slightly larger than the area thereof at the inner face 55. Conventional suction rolls have drilled holes which are countersunk to create a nozzle effect and the nozzle structure results in a high noise level. There is no such nozzle effect in the honeycomb openwork of this invention whereby the advantage of greatly reduced noise level is secured. The circumferential taper of the hexagonal conduits 51, 52 and 53 is best shown in FIG. 4.

Each pair of strips such as 60 and 61 includes the longitudinally extending walls 44 at each opposite end thereof which are supported on the cylindrical seats 28 of the slotted end rings 26 of the roll end heads 21 and 22. Some of the pairs of strips, for example every tenth pair of strips such as 60, are of increased length and anchored in a slot 27 of the ring 26. The double walls 44 of the strips 31 and 32, united by the adhesive layer 62, have their outer faces adhesively united to the inner faces of a slot 27 by layers 64 and 65 of epoxy resin as shown.

Preferably the slots 27 are spaced apart about five degrees of angular distance entirely around the periphery of the rings 26 of heads 21 and 22 for the best results and economy of manufacture. In a roll of greater than forty inches outside diameter, more than seventy-two slots may be provided in proportion to the increase of diameter.

Preferably mutual support is also provided at longitudinally spaced zones along the roll by means of laterally extending annular bars such as 70, 71, 72 and 73. Each bar, or ring, 70 is radially slotted as at 74, 75 and 76 (FIG. 4) in the outer peripheral portion 77 to receive each of the doubled walls such as 46 of each pair of strips 60 and 61 and the inner peripheral portion 78 is continuous and unslotted. It should be noted that the annular, slotted bars such as 70 of the openwork 30 are entirely within the confines of the openwork because of the corresponding slots such as 81 in the inner, or lower portions of the doubled walls such as 46, and the bars, therefore, do not project into the interior of the hollow cylindrical roll 20. The inside rim 79 of each bar 70 is flush with the inner face 55 of the openwork, but the outside rim 80 of the bar is spaced inwardly from the outer face 57 of the openwork in order to permit uniform wear and avoid interference with the flow of fluid through the hexagonal conduits.

Figure 3:
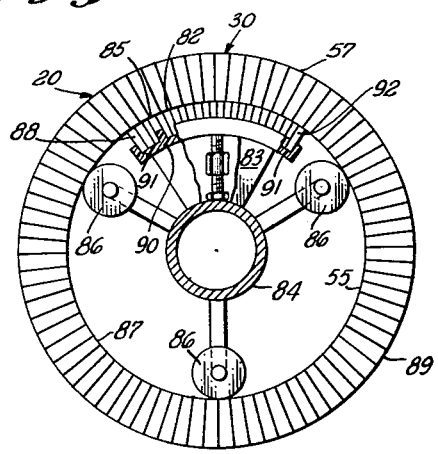
FIG. 3 is an end view showing in section the honeycomb openwork of the invention used as an arcuate suction box seal as well as a hollow cylindrical roll covering cooperating therewith.

As shown in FIG. 3 the honeycomb openwork 30 may be used as a foraminous hollow cylindrical covering for a cylindrical roll 89, and an arcuate frame section 82, of such honeycomb openwork, may also be used as an edge seal for a cooperating suction box 83.

The suction box 83 is stationary and mounted on the suction pipe 84 for exhausting fluid through the suction box opening 85. The cylindrical roll 89 is rotatably supported on pipe 84 by means of a plurality of rollers, such as 86, which engage the inside face 87 of the roll or by bearings of any suitable type. The arcuate frame section 82 outlines a longitudinally extending segment of a roll such as 20 and constitutes an edge seal lining the suction box opening 85 with honeycomb openwork 88 identical with that of the roll 89. The openwork 88 is several inches in width and secured by epoxy resin 90 to the angular frame pieces 91 to create cells 92 rather than passages. It has been found that the honeycomb openwork 30 of the cylindrical roll 89 and the honeycomb cells 92 of the edge seal 82 not only closely fit and seal the interface, but serve the same purpose as a labyrinth to create a pressure drop across the interface due to the air passing by the cells. The structure is also useful as a dryer when the path of air therethrough is reversed to blow the air outwardly rather than to draw the air inwardly.

It will be understood that the hexagonal conduits in the openwork 30 of the roll 89 will be covered on the outer face 57 by paper, or filled with water, and therefore become cells, and the openwork 30 becomes a cellular honeycomb facing at 87. A clearance condition of .017 inch has proven to be optimum to maximum turbulence caused by high velocity air passing across the honeycomb facing and such turbulence tends to seal the suction box most effectively. Clearance and pressure may be adjusted by a suitable threaded device 96 at each end of the suction box for moving the frame section 82 toward and away from the inner face 87 of roll 89.

The strips 31, 32, 33 and 34 may be of stainless steel, or the like. However, when the openwork 30 is to be used as a suction box cover or seal, or is to be engaged by Fourdrinier wires of plastic material, I prefer that the strips 31, 32, 33 and 34 be of synthetic plastic such as polytetrafluoroethylene or "Teflon," combined with other inert materials and commercially available as "Rulon A" or that they be of fluorocarbon resin or the like. When honeycombed, as disclosed herein, no underbase or support is required, the "Teflon" honeycomb being self-supporting. The strips 31, 32, 33 and 34 of each openwork 30 are preferably about twenty-thousandths of an inch in thickness but may be in a range of .004 to .030 inch in thickness depending on the length and diameter of the roll.

I claim:

1. A paper making machine suction assembly, said assembly comprising a stationary suction box, means for exhausting air from said suction box, a honeycomb openwork of arcuate configuration forming an edge lining for said suction box and a hollow cylindrical honeycomb openwork, mounted for rotation around said suction box, the inside face thereof being in rubbing engagement with the outside face of said arcuate suction box lining during said rotation for creating a suction box edge seal.

2. A suction roll assembly, said assembly comprising a cylindrical, honeycomb openwork, having radially extending fluid passages, mounted for rotation around a longitudinal axis; a stationary suction box mounted within said cylindrical openwork, said suction box having a suction opening at a spaced distance from the inside face of said cylindrical openwork and an edge seal of said honeycomb openwork lining said suction box opening, the outside face of the openwork of said seal being in rubbing contact with the inside face of said cylindrical honeycomb openwork to form a honeycomb interface therewith for creating a pressure drop across said interface.

3. A combination as specified in claim 2 wherein the honeycomb of said edge seal lining is secured to a frame piece which closes the fluid passages thereof, on the inside, to convert said passages to cells.

4. A combination as specified in claim 2 wherein said honeycomb edge seal lining is mounted on a movable frame piece and said suction assembly includes means for moving said frame pieces radially for adjusting the clearance and pressure of said edge lining relative to the inside face of said cylindrical openwork.

5. A suction roll assembly comprising a cylindrical, honeycomb openwork of thin strip material rotatable around a longitudinal axis and having a smooth unobstructed inside face formed by the inside edges of the walls of the fluid passages therethrough; stationary fluid pressure means within said roll, said means including a fluid pressure opening and a strip of honeycomb material lining the edge of said fluid pressure opening with the outside edges of the walls of the cells in said strip in rubbing engagement with the inside edges of the walls of said cylindrical openwork for forming a honeycomb cell interface to seal said fluid pressure opening of said stationary fluid pressure means.

6. A suction roll assembly comprising a cylindrical suction roll having a foraminous surface formed of thin strips defining radial fluid passages; a suction box mounted within said roll, said box having a suction opening of part cylindrical outline conforming to the shape of the inner face of said roll; a continuous lining extending around the edge of said suction opening, said lining being formed of thin strips defining dead-end, radial cells opening outwardly to form a labyrinth cellular interface with the inner face of said roll and means for passing air through said suction box opening, the passage of said air creating an air turbulence across said interface to seal said suction box.

7. A combination as specified in claim 6 wherein the inner face of said roll and the outer face of said lining are spaced apart a uniform distance forming a clearance of about .017 inch.

8. A combination as specified in claim 6 wherein the strips of the foraminous surface of said roll and the strips of said lining are about .004 to .030 inch in thickness and bent to form a hexagonal honeycomb with the area of the inner openings of said roll and lining slightly smaller than the area of the respective outer openings thereof.

9. A paper making machine assembly comprising a suction box having a suction opening outlining a segment of a cylinder; a suction roll, mounted to rotate around said suction box, said roll having a foraminous surface with radially extending fluid passages; a cellular lining extending continuously around said suction box opening, the openings of the cells in the outer face of said lining forming an interface with the openings of the fluid passages in the inner face of said roll; conduit means connected to said suction box, for drawing air inwardly into, or blowing air outwardly from, said suction box opening, and means for adjusting the clearance between said roll and lining, at said interface, for securing the maximum turbulence of high velocity air passing across said interface to seal said suction box.

References Cited in the file of this patent

UNITED STATES PATENTS

| | | |
|---|---|---|
| 2,240,869 | Specht | May 6, 1941 |
| 2,803,172 | Trotman | Aug. 20, 1957 |
| 2,979,005 | Herbert | Apr. 11, 1961 |
| 3,047,648 | Kelly | July 31, 1962 |
| 3,072,225 | Cremer et al. | Jan. 8, 1963 |

FOREIGN PATENTS

| | | |
|---|---|---|
| 396,980 | Germany | June 12, 1924 |
| 793,886 | Great Britain | Jan. 9, 1956 |